(12) United States Patent
Takahashi et al.

(10) Patent No.: US 6,398,268 B1
(45) Date of Patent: Jun. 4, 2002

(54) PIPE COUPLING FOR FEMALE SCREW

(75) Inventors: Masaki Takahashi; Takeya Sasa, both of Tokyo (JP)

(73) Assignee: Nitto Kohki Co., Ltd., Tokyo (JP)

( * ) Notice: Subject to any disclaimer, the term of this patent is extended or adjusted under 35 U.S.C. 154(b) by 0 days.

(21) Appl. No.: 09/612,426

(22) Filed: Jul. 7, 2000

(51) Int. Cl.$^7$ ............................................... F16L 37/18
(52) U.S. Cl. .................. 285/316; 285/305; 285/33; 285/34; 285/35
(58) Field of Search .................. 285/316, 305, 285/33, 34, 35

(56) References Cited

U.S. PATENT DOCUMENTS

| | | | | |
|---|---|---|---|---|
| 2,279,146 A | * | 4/1942 | Schneller | 285/277 |
| 3,757,836 A | * | 9/1973 | Masuda | 141/312 |
| 3,778,092 A | * | 12/1973 | Magorien | 285/316 |
| 4,444,223 A | * | 4/1984 | Maldavs | 137/614.04 |
| 4,716,938 A | | 1/1988 | Weh et al. | |
| 4,825,893 A | * | 5/1989 | Gailey | 137/75 |
| 4,865,292 A | * | 9/1989 | Ekman | 251/149.6 |
| 5,443,291 A | * | 8/1995 | Stucchi et al. | 285/316 |
| 5,649,723 A | * | 7/1997 | Larsson | 285/34 |
| 5,788,290 A | * | 8/1998 | Meisinger | 285/316 |

FOREIGN PATENT DOCUMENTS

JP        2758380        5/1998

* cited by examiner

*Primary Examiner*—B. Dayoan
*Assistant Examiner*—Carlos Lugo
(74) *Attorney, Agent, or Firm*—Pennie & Edmonds LLP (57) ABSTRACT

A pipe coupling for a female screw to be connected to a female screw port formed in a fluid device, comprising a cylindrical main body. The main body includes a plurality of arm members having a male crew portion at a distal end to be connected to the female screw port. Also, the main body comprises a sliding member that slides from a close to an open position with respect to the arms members. The main body is provided with a lock member for stopping the movement of the sliding member.

6 Claims, 6 Drawing Sheets

PIPE COUPLING FOR FEMALE SCREW

BACKGROUND OF THE INVENTION

This invention relates to a pipe coupling for a female screw which has a male screw to be connected to a female screw port formed in a fluid pressure device.

Figure 8:
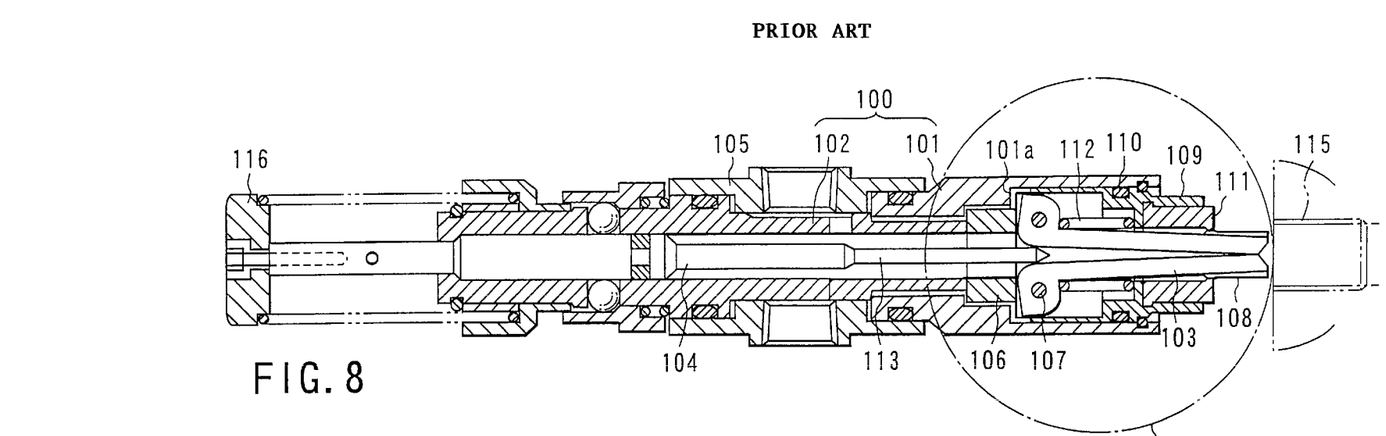
FIG. 8 is a sectional view of a conventional pipe coupling for a female screw, showing its non-connected state.
Figure 9:
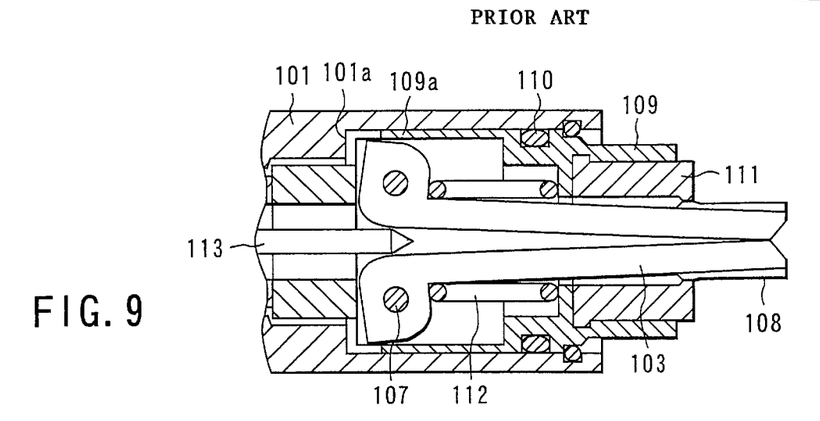
FIG. 9 is an enlarged view of an encircled section IX in FIG. 8.

Japanese Patent No. 2758380, for example, discloses a pipe coupling for a female screw which has a male screw to be connected to a female screw port formed in a fluid pressure device. FIGS. 8 and 9 show the basic structure of the pipe coupling disclosed in the patent. FIG. 8 is a sectional view of the pipe coupling, showing its non-connected state, and FIG. 9 is an enlarged view of a section A incorporated in the pipe coupling. In the following description, the words "forward (front)" and "rearward (rear)" mean the right-hand direction and the left-hand direction in FIG. 8, respectively.

As shown, the pipe coupling for a female screw disclosed in the patent comprises a cylindrical body 100, arm members 103 provided at the front end of the body 100, and a sliding rod 104 fitted in the body 100. The cylindrical body 100 includes a front cylinder 101 and a rear cylinder 102. The front and rear cylinders 101 and 102 are connected to each other by screwing a male screw provided on the outer peripheral surface of a front end portion of the rear cylinder 102, into a female screw formed in the inner peripheral surface of a rear end portion of the front cylinder 101. Further, a connecting cylinder 105 is fitted on a connecting section of the front and rear cylinders 101 and 102. A cylindrical stepped arm base 106 is engaged with the inner peripheral surface of the front cylinder 101. The arm members 103 are supported by the front end of the arm base 106 so that they can swing about their respective support shafts 107. The arm members 103 are arranged to swing between an open position in which they are parallel to the longitudinal central axis of the cylindrical body 100, and a closed position in which they are inclined to the axis. The front end portions of the arm members 103 project forward (i.e. in the right-hand direction in the figure) from the front end of the front cylinder 101. Engagement portions (male screw portions) 108 are formed on the outer peripheral surfaces of front end portions of the arm members 103, so that they will be engaged with the female screw portion formed in the inner surface of a female screw port 115 in a fluid pressure device, when the arm members 103 are in the open position.

A cylindrical seal holder 109 is fitted in a front end portion of the front cylinder 101. An O-ring 110 is fitted on the outer peripheral surface of the seal holder 109, thereby airtightly sealing a clearance between the seal holder 109 and the front cylinder 101. A seal ring 111 is fitted in a front end portion of the seal holder 109. The rear end of the seal holder 109 is slidably inserted between the inner peripheral surface of the front cylinder 101 and the outer peripheral surface of the arm base 106. The seal holder 109 is always urged in the right-hand direction in the figure by a spring 112 located between itself and the arm members 103. As a result, the seal ring 111 is also urged in the right-hand direction in the figure.

In the open position, the opposed inner surfaces of the arm members 103 are parallel to each other. At this time, the distance between the opposed inner surfaces of the arm members 103 is substantially the same as the outer diameter of a lock pin 113, described later, incorporated in the sliding rod 104. On the other hand, in the closed position, the distal ends of the arm members 103 contact each other and the diameter of the contact portion of the male screw portions 108 is small, as is shown in FIG. 8.

When the lock pin 113 is inserted between the arm members 103, the outer peripheral surface of the lock pin 113 is engaged with the inner surfaces of the arm members 103, thereby outwardly opening the arm members 103 and keeping them in the open position.

The operation of connecting the pipe coupling constructed as above to a port in a fluid device will be described with reference to FIGS. 8 and 9. First, in the state shown in FIG. 8, the distal ends of the arm members 103 are inserted into the female screw port 115 of the fluid device, thereby further forwarding the pipe coupling and pushing the seal holder 109 into the front cylinder 101 against the urging force of the spring 112 with the seal ring 111 at the seal holder 109 side kept in contact with the fluid device. After that, the pressing surface 116 of the sliding rod 104, which constitutes the rear end of the rod, is pushed forward, thereby inserting the lock pin 113 between the arm members 103 and causing the arm members 103 to swing about the support shafts 107 and assume the open position. As a result, the male screw portions 108 formed of the front end portions of the arm members 103 are engaged with the female screw portion formed in the inner peripheral surface of the female screw port 115 of the fluid device. Further, in this state, the seal ring 111 is in contact with the end surface of the female port 115, thereby sealing a clearance between the pipe coupling and the fluid device, and also maintaining a state in which the pipe coupling is prevented from being disconnected from the fluid device.

When, in the connecting operation, the arm members 103 assume the open position about the support shafts 107, it is possible that the peaks of the thread of the male screw portions 108 of the arm members 103 will be aligned with the peaks of the thread of the female screw portion formed in the inner surface of the female screw port 115, and hence the male and female screws will not be engaged with each other. In this case, it is necessary to slightly move the pipe coupling forward or backward so as to shift the arm members 103 by half of one peak of the thread, in order to engage the screws with each other. When backwardly shifting the arm members 103 by half of one peak, with the rear end 109a of the seal holder 109 kept in contact with a stepped portion 101a formed in the inner peripheral surface of the front cylinder 101 as shown in FIG. 9, the seal holder 109 urged by the spring is shifted forward by half of one peak, and therefore the screws can be engaged with each other. However, when, in order to engage the screws, forward shifting the arm members 103 by half of one peak, and backward shifting the seal holder 109, urged by the spring, by half of one peak, the seal holder 109 cannot be shifted backward since the rear end 109a comes in contact with the stepped portion 101a. Accordingly, the arm members 103 cannot be shifted forward, which means that the screws cannot completely be engaged with each other (an unstable connecting state is established). If in this state, the screws are still tried to be engaged with each other, it is necessary to press the cylindrical body 100 by pressing the sliding rod 104 with an excessive force, or to press the cylindrical body 100 itself to thereby significantly deform the seal ring 111. This indicates a low operability of the pipe coupling, and may adversely affect the durability of the seal ring. Moreover, when, in order to engage the male screw 108 with the female screw formed in the inner surface of the port 115, the sliding rod 104 is inserted between the arm members 103 to open the arm members 103, and also the arm members are shifted backward by half of one peak so as to eliminate the defective engagement of the screws, in a state in which the spring 112 is not compressed (not warped), i.e. in a state in which the seal holder 109 is not pushed into the front cylinder 101 against the urging force of the spring 112, it is possible that the seal ring 111 of the seal holder 109 will be separated from the end face of the female screw port 115, thereby causing defective sealing.

BRIEF SUMMARY OF THE INVENTION

It is a main object of the invention to provide a pipe coupling for a female screw, in which the state of engagement between a female screw portion formed in the inner peripheral surface of a female screw port incorporated in a fluid device, and male screw portions formed on distal end portions of arm members of the pipe coupling can be corrected by a natural and simple operation, and in which no excessive force is applied to a seal ring and hence the seal ring can have a long life.

It is another object of the invention to provide a pipe coupling for a female screw, which can reliably seal a female screw port incorporated in a fluid device to be connected, with a female screw portion, formed in the inner peripheral surface of the female screw port, correctly engaged with male screw portions formed on distal portions of arm members of the pipe coupling.

To attain the objects, there is provided a pipe coupling for a female screw to be connected to a female screw port formed in a fluid device, comprising: a cylindrical pipe coupling main body; a plurality of arm members contained in the pipe coupling main body and radially displaceable with respect to the pipe coupling main body, each of the arm members having a male screw portion provided on a distal end portion thereof and to be connected to the female screw port, the distal end portion projecting from an end of the pipe coupling main body to an outside thereof; a sliding member forward and backward slidably inserted in the pipe coupling main body, the sliding member shifting, by forward and backward movement thereof, the arm members between a closed position in which distal ends of the arm members contact each other, and an open position in which the distal ends of the arm members are separated from each other and the male screw portions of the distal end portions of the arm members can be engaged with the female screw port of the fluid device; a fluid passage formed in one of the sliding member and the pipe coupling main body and to be connected to a fluid passage formed in the fluid device when the male screw portions engage with the female screw port; a lock member provided in the pipe coupling main body for stopping movement of the sliding member such that the arm members are kept in the open position; a seal holder provided at an end of the pipe coupling main body and arranged to move forward and backward between an inner peripheral surface of the pipe coupling main body and outer peripheral surfaces of the arm members; a spring seat fitted on outer peripheral surface of the arm members such that it can move forward and backward; a spring interposed between the spring seat and the seal holder and urging the spring seat and the seal holder away from each other; a seal member provided on the seal holder and to be pressed against around the female screw port of the fluid device by an urging force of the spring to seal the female screw port; and a pressing member provided on the sliding member and to be brought into contact with the spring seat when the sliding member is moved in a direction in which the arm members are opened, thereby moving the spring seat so as to increase the urging force of the spring.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Reference will now be made in detail to the presently preferred embodiments of the invention as illustrated in the accompanying drawings.

Figure 1:
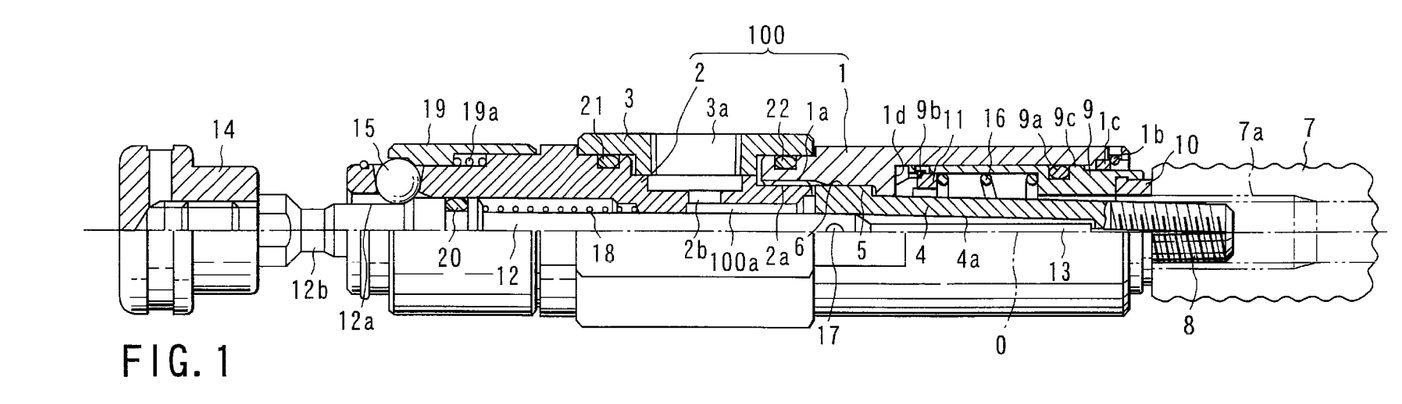
FIG. 1 is a partially sectional view of a pipe coupling for a female screw according to a first embodiment of the invention, showing its non-connected state.
Figure 2:
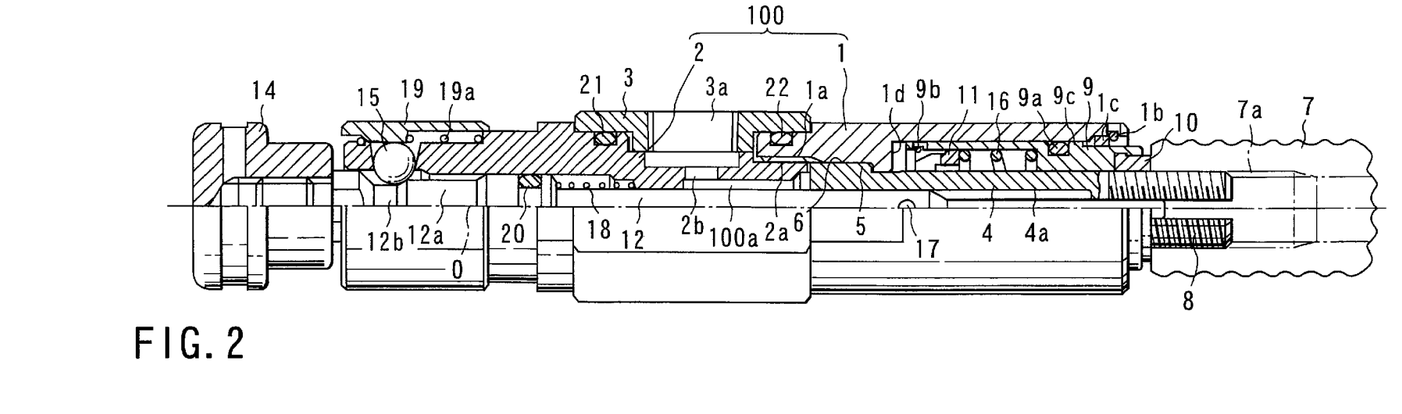
FIG. 2 is a partially sectional view of the pipe coupling of FIG. 1, showing its connected state.

FIGS. 1 and 2 show a pipe coupling for a female screw according to a first embodiment of the invention, FIG. 1 being a partially sectional view of the pipe coupling, showing its non-connected state, and FIG. 2 being a partially sectional view of the pipe coupling, showing its connected state. In the following description, the words "forward (front)" and "rearward (rear)" mean the right-hand direction and the left-hand direction in the figures, respectively.

As shown, reference numeral 1 denotes a front cylinder, and reference numeral 2a rear cylinder. The outer peripheral surface 2a of the rear cylinder 2 is engaged, by screwing, with the inner peripheral surface 1a of a rear end portion of the front cylinder 1, thereby constituting a single cylindrical body 100. A connecting cylinder 3 is rotatably fitted on a front portion of the rear cylinder 2 and held between the front and rear cylinders 1 and 2. A circulation hole 3a is formed in the connecting cylinder 3 for permitting a fluid to flow therein, while a communication hole 2b is formed in the rear cylinder 2. The communication hole 2b of the rear cylinder 2 communicates with the circulation hole 3a of the connecting cylinder 3, and these holes communicate with a fluid passage 100a formed in the cylindrical body 100.

In the front cylinder 1, semi-cylindrical arm members 4 constructed openable and closable are inserted symmetrical with respect to the axis of the front cylinder 1. A recess 6 is formed in the inner peripheral surface of a rear portion of the front cylinder 1. A projection 5 is formed on the outer peripheral surface of an end portion of each arm member and situated in the recess 6. In the recess 6, the projections 5 are held between a rear end portion of the front cylinder 1 and a front end portion of the rear cylinder 2. In the state in which the projections 5 are fitted and held in the recess 6, the arm members 4 can shift between an open position in which they are parallel to the longitudinal central axis O of the cylindrical body 100, and a closed position in which the arm members inclines to the axis O of the cylindrical body 100. Rear and front portions of each arm member 4 are substantially arc-shaped. The distal ends of the arm members 4 protrude forward (in the right-hand direction in the figure) from the front end surface of the front cylinder 1. Further, engagement portions (male screw portions) 8, to be engaged with a female screw portion 7a formed in the inner surface of the female screw port 7 of the fluid device when the arm members are in the open position, are provided on the outer peripheral surfaces of front end portions of the arm members 4.

A seal holder 9 is slidably inserted in a front-end-side hole formed in the front cylinder 1. A seal ring 10 is provided on the front end of the seal holder 9. An O-ring 9a is fitted on the outer peripheral surface of the seal holder 9, thereby airtightly sealing a clearance between the seal holder 9 and the front cylinder 1. The seal holder 9 is prevented from coming off by means of a ring guide 1c, which is fixed by a stop ring 1b provided on the inner peripheral surface of a front end portion of the front cylinder 1.

A ring-shaped spring seat 11 is slidably fitted between the outer peripheral surfaces of the arm members 4 and the inner peripheral surface of a rear end portion of the seal holder 9. The ring-shaped spring seat 11 is prevented from coming off by means of a stop ring 9b (this ring is not always necessary) provided on the seal holder 9. A spring 16 is interposed between the seal holder 9 and the ring-shaped spring seat 11 so that it urges the seal holder 9 and the ring-shaped spring seat 11 away from each other. In this state, a clearance is defined between a step 9c formed on the outer peripheral surface of the seal holder 9 and the guide ring 1c, through which the seal holder can move.

In the open position, the opposed inner surfaces of the arm members 4 are parallel to each other. Further, in the open position, recesses 4a formed in the inner peripheral surfaces of rear end portions of the arm members 4 cooperate to form an inner hole that has substantially the same diameter as the outer diameter of a sliding rod 12 described later. On the other hand, in the closed position, the distal ends of the arm members 4 contact each other as shown in FIG. 1, whereby the outer diameter of the contact portion of the arm members, which includes the male screw portions 8, is smaller than the inner diameter of the female screw 7a of the female screw port 7 in the fluid device.

Since a lock pin 13, described later, incorporated in the sliding rod 12 is received in the recesses 4a when the pipe coupling is not operated, the distal ends of the arm members 4 contact each other, as is shown in FIG. 1. Pins (pressing members) 17 protruding from the outer peripheral surfaces of the arm members 4 and located therebetween are attached to the sliding rod 12. When the pins 17 move to the right in the figure between the arm members 4, they are engaged with the ring-shaped spring seat 11 and shift the seat 11 to the right in the figure. The lock pin 13, which has a smaller diameter than the sliding rod 12, is formed integral as one body with the front end of the sliding rod 12. A pushing knob 14 is fixed to the rear end of the sliding rod 12. The sliding rod 12 is urged in the left-hand direction in the figure by a spring 18 interposed between itself and the rear cylinder 2.

A ball (a locking member) 15 is provided at the rear end of the rear cylinder 2. The ball 15 is pushed toward the axis O (radially inwardly) by a sleeve 19 slidably provided on the outer peripheral surface of the rear cylinder 2. The sliding rod 12 has a middle-diameter portion 12a supporting the ball 15, and a groove portion (a small-diameter portion) 12b for receiving the ball 15 radially inwardly dropped toward the axis O. When the pipe coupling is not operated, the ball 15 is urged against the middle-diameter portion 12a by the sleeve 19 (see FIG. 1). A spring 19a is interposed between the sleeve 19 and the rear cylinder 2 for moving the sleeve 19 along the axis toward the rear end of the pipe coupling to thereby push the ball 15 toward the axis O. The ball 15, the sleeve 19, the spring 19a and the small-diameter portion 12b constitute lock means, described later, for maintaining the sliding rod 12 in its advanced position.

In FIG. 2, reference numeral 20 denotes an O-ring that airtightly seals a clearance between the inner peripheral surface of the rear cylinder 2 and the outer peripheral surface of the sliding rod 12, reference numeral 21 an O-ring that airtightly seals a clearance between the outer peripheral surface of the rear cylinder 2 and the inner peripheral surface of the connecting cylinder 3, and reference numeral 22 an O-ring that airtightly seals a clearance between the outer peripheral surface of the front cylinder 1 and the inner peripheral surface of the connecting cylinder 3.

Furthermore, in this embodiment, the urging force F1 of the spring 16 located between the seal holder 9 and the ring-shaped spring seat 11 is set larger than the urging force F2 of the spring 18 interposed between the sliding rod 12 and the rear cylinder 2 (F2<F1). Accordingly, when the seal ring 10 in contact with the seal holder 9 is urged against the fluid device while pushing the pushing knob 14 to connect the pipe coupling to the fluid device, the ring-shaped spring seat 11 fitted in the seal holder 9 is brought into contact with a stepped portion 1d of the front cylinder 1 without compressing the spring 16, while the spring is warped and the pins 17 attached to the sliding rod 12 are brought into contact with the ring-shaped spring seat 11 (at this time, the spring is not yet warped or compressed). When in this state, the pushing knob 124 is further pushed, both the springs 16 and 18 are compressed, and the seal holder 9 can move forward or backward until the screws 7a and 8 are engaged with each other. Accordingly, the pipe coupling can be connected through one-touch operation in a state in which the seal ring 10 can be moved for sealing until the connecting operation is finished.

The operation of connecting the pipe coupling to the port of the fluid device will now be described with reference to FIGS. 1 and 2.

In the state shown in FIG. 1, the pushing knob 14 is pushed to thereby move the pipe coupling forward, with the distal ends of the arm members 4 inserted in the female screw port 7 of the fluid device, thereby pressing the seal ring 10 of the seal holder 9 against the fluid device. As a result, the seal ring 10 of the seal holder 9 is pushed into the front cylinder 1 against the urging force of the spring 16. When the pushing knob 14 provided at the rear end of the sliding rod 12 is further pushed forward, the lock pin 13 of the sliding rod 12 is inserted between the distal ends of the arm members 4, thereby swinging the arm members 4 about the respective projections 5 to open them as shown in FIG. 2, and engaging the male screw portions 8 of the arm members 4 with the female screw portion 7a formed in the inner peripheral surface of the female screw port 7. At this time, the ball 15 pressed toward the axis O by the sleeve 19 falls onto the small diameter portion 12b of the sliding rod 12, whereby the sliding rod 12 is kept in its pushing state, and therefore the pipe coupling is prevented from being disconnected from the fluid device.

If, in a series of connecting operations described above, the seal ring 10 of the seal holder 9 is pressed against the fluid device while pushing the sliding rod 12, the ring-shaped spring seat 11 fitted in the seal holder 9 moves toward the stepped portion 1d of the front cylinder 1 without compressing the spring 16, and the spring 18 is warped and compressed. As a result, the pins 17 attached to the sliding rod 12 is brought into contact with the ring-shaped spring seat 11 before the spring seat 11 is brought into contact with the stepped portion 1d of the front cylinder 1. When the pushing knob 14 is further pushed, the spring seat 11 moves to the right in the figure against the urging force of the spring 16, whereby both the springs 16 and 18 contract. Accordingly, the seal ring 10 is reliably pressed against the port and its vicinities of the fluid device, which means that the ring 10 reliably seals the fluid device. In this state, the seal holder 9 can be moved forward or backward until the screws 7a and 8 are engaged with each other. If, as described above, the seal ring 10 can be always inserted into the front cylinder 1 against the urging force of the spring 16 in the connecting operation, (1) the seal ring 10 is prevented from deforming to the maximum extent, and an excessive stress does not occur in the seal ring 10, which means that the seal ring 10 can have a long life. Further, (2) even when in the open position of the arm members 4, the peaks of the thread of the male screw portions 8 are aligned with the peaks of the thread of the female portion 7a of the female port 7, which means that the screws are not engaged with each other, the pipe coupling can be easily moved forward and backward without applying excessive stress upon the seal ring. Accordingly, both the screws can be engaged with each other by moving forward or backward the arm members 4 by half of one peak. Moreover, the forward/backward movement of the seal holder 9 does not change the urging force of the spring 16, but the forward/backward movement of the sliding rod 12 does change the urging force of the spring 16. Therefore, even when correcting the engagement state of the screws, the seal ring 10 can execute reliable sealing.

Figure 3:
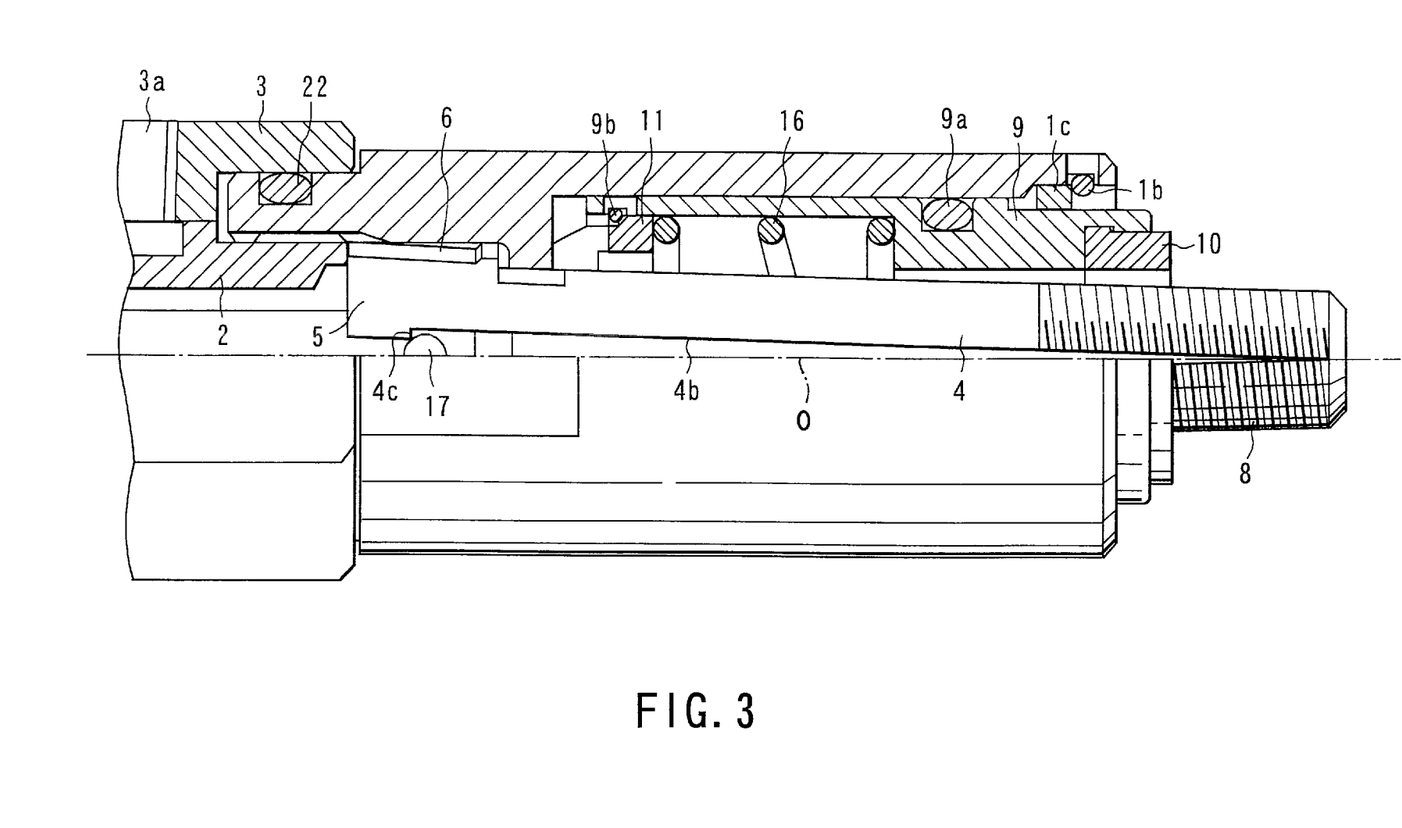
FIG. 3 is an enlarged sectional view of an essential part of a pipe coupling for a female screw according to a second embodiment of the invention, showing its non-connected state.
Figure 4:
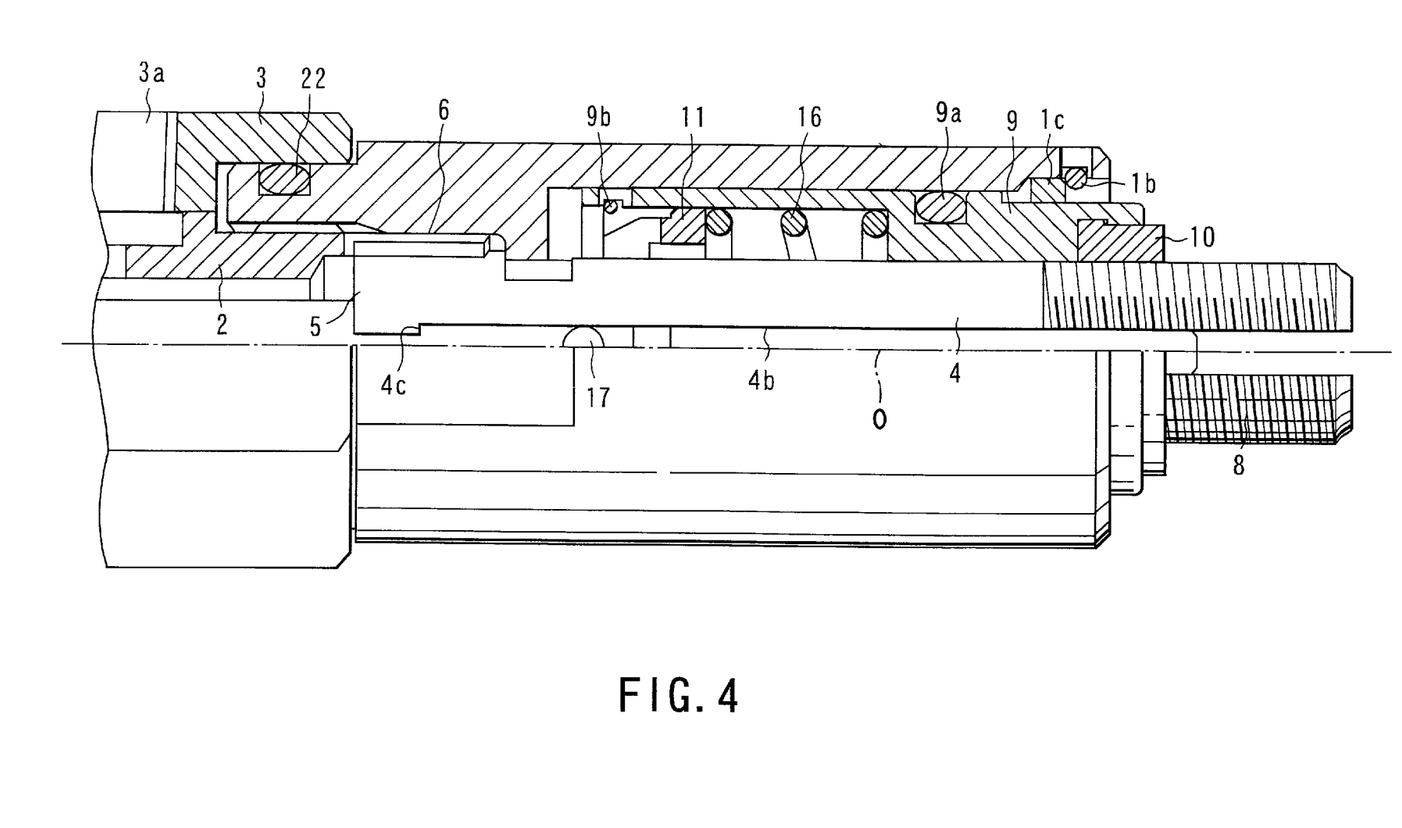
FIG. 4 is an enlarged sectional view of the essential part of the pipe coupling of FIG. 3, showing its connected state.

FIGS. 3 and 4 show a pipe coupling for a female screw according to a second embodiment of the invention. FIG. 3 is an enlarged sectional view of an essential part of the pipe coupling, showing its non-connected state. FIG. 4 is an enlarged sectional view of the essential part of the pipe coupling, showing its connected state. In this section, the structure different from that of the first embodiment will be mainly described, and reference numerals corresponding to those in the first embodiment denote similar structural elements.

This embodiment is characterized by comprising a mechanism for urging the arm members 4 in a direction in which they are closed, so that the distal ends of the arm members 4 are forcibly closed when the pipe coupling is not used.

As is shown in FIG. 3, the opposed inside surfaces 4b of the arm members 4 have respective stepped portions 4c to be brought into contact with the pins 17 attached to the sliding rod 12. The stepped portions 4c are provided in positions in which they contact the pins 17 when the pipe coupling is not operated (not connected). Accordingly, the proximal ends of the arm members 4 are urged away from each other by the pins 17 when the pipe coupling is not operated, with the result that the distal ends of the arm members 4 are kept in contact with each other when the pipe coupling is not operated.

Further, when the lock pin 13 of the sliding rod 12 is inserted between the distal ends of the arm members 4 to connect the pipe coupling to the fluid device, the arm members 4 swing about the projections 5, and the male screw portions 8 formed on the distal ends of the arm members 4 are engaged with the female screw portion 7a formed in the inner peripheral surface of the female screw port 7 of the fluid device. In this state, the ball 15 pressed toward the axis O by the sleeve 19 falls onto the small-diameter portion 12b of the sliding rod 12, thereby keeping the sliding rod 12 in its pushed state. In accordance with the pushing operation of the sliding rod 12, the lock pin 13 of the sliding rod 12 moves toward the distal ends of the arm members 4, whereby the pins 17 attached to the sliding rod 12 are brought into contact with the ring-shaped spring seat 11, which, in turn, moves to the right in the figure against the urging force of the spring 16. As a result of this movement, the seal ring 10 is reliably pressed by the urging force of the spring 16 against a portion of the fluid device around the female screw port 7.

Figure 5:
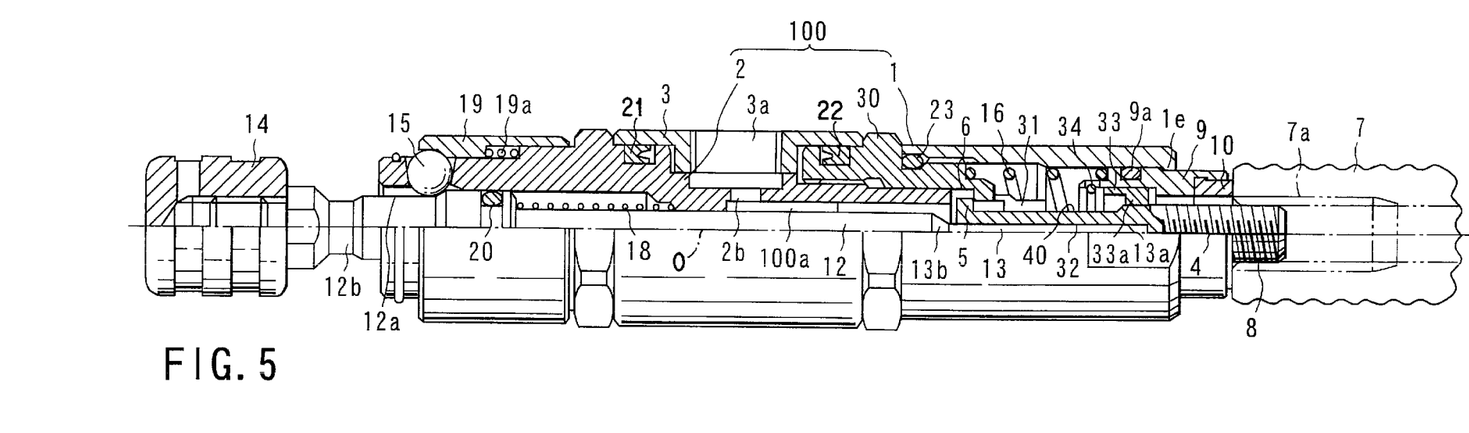
FIG. 5 is a partially sectional view of a pipe coupling for a female screw according to a third embodiment of the invention, showing its non-connected state.
Figure 6:
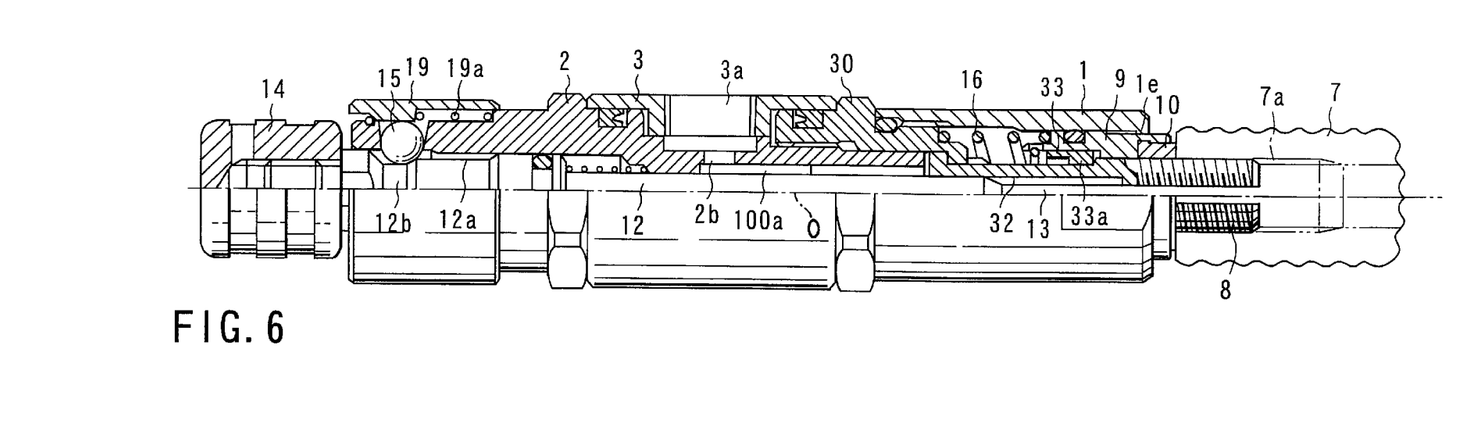
FIG. 6 is a partially sectional view of the pipe coupling of FIG. 5, showing its connected state.

FIGS. 5 and 6 show a pipe coupling for a female screw according to a third embodiment of the invention. FIG. 5 is a partially sectional view of the pipe coupling, showing its non-connected state. FIG. 6 is a partially sectional view of the pipe coupling, showing its connected state. In this section, the structure different from that of the first embodiment will be mainly described, and reference numerals corresponding to those used in the first embodiment denote similar structural elements.

In the first embodiment, the male screw portions 8 of the arm members 4 are engaged with the female screw portion 7a of the fluid device by swinging the arm members 4 from their inclined state (closed state) to their parallel state (open state). On the other hand, the third embodiment differs from the first embodiment in that the engagement portions (male screw portions) 8 of the arm members 4 are directly (i.e. without swinging) engaged with the female screw portion 7a of the fluid device. In other words, the arm members 4 are parallel shifted in a direction perpendicular to the axis of the front cylinder 1 to engage the male screw portions 8 with the female screw portion 7a. Further, the first and third embodiments also differ in the structure for forwardly urging the seal ring 10.

In FIGS. 5 and 6, reference numeral 1 denotes a front cylinder, reference numeral 2 a rear cylinder, and reference numeral 30 a middle cylinder. The inner peripheral surface of a rear end portion of the front cylinder 1 is engaged, by screwing, with the outer peripheral surface of a front end portion of the middle cylinder 30, and the inner peripheral surface of a rear end portion of the middle cylinder 30 is engaged, by screwing, with the outer peripheral surface of a front end portion of the rear cylinder 2, thereby forming a single cylindrical body 100. A connecting cylinder 3 is rotatably held between the middle cylinder 30 and the rear cylinder 2. A circulation hole 3a is formed in the connecting cylinder 3 for permitting a fluid to flow therein, while a communication hole 2b is formed in the rear cylinder 2. The communication hole 2b and the circulation hole 3a communicate with a fluid passage 100a formed in the cylindrical body 100.

A recess 6 is formed in the inner peripheral surface of a rear portion of the middle cylinder 30, and receives projections 5 formed on the outer peripheral surfaces of respective end portions of the arm members 4. The portion of the middle cylinder 30, which is located at the front end of the recess 6, has cutout portions 31 for limiting the rotation of the arm members 4. The projections 5 of the arm members 4 are received in the recess 6 and located between the rear cylinder 2 and the middle cylinder 30.

The arm members 4 have respective recesses 32 formed therein and receiving a lock pin 13 incorporated in a sliding rod 12. When the main body of the sliding rod 12 is inserted into the recesses 32 and the lock pin 13 is inserted between the distal ends of the arm members 4, the arm members 4 are opened and made parallel by a front end portion 13a and the inclined surface 13b of a rear end portion of the lock pin 13, and are radially shifted from a closed position in which they are parallel to the axis O of the front cylinder 1, to an open position in which they are also parallel to the axis O of the front cylinder 1.

A seal holder 9 is slidably inserted in a front end portion of the front cylinder 1. A seal ring 10 is attached to the seal holder 9. A spring 16 forwardly urging the seal holder 9 is interposed between the seal holder 9 and the middle cylinder 30. The seal holder 9 is prevented from coming off by a projection 1e formed on the inner peripheral surface of the front cylinder 1. A ring-shaped collar 33 is slidably provided in a hole formed in the seal holder 9. The collar 33 is prevented from coming off by a stop ring 34. A clearance that permits the collar 33 to slide is formed between the collar 33 and the stop ring 34. A projection 33a is formed on the inner peripheral surface of the collar 33, and an escape recess 40 is formed in the outer peripheral surface of each of the arm members 4 for receiving the projection 33a.

The lock pin 13 for opening the arm members 4 is formed integral as one body with the front end of the sliding rod 12. The outer diameter of the main body of the sliding rod 12 is set substantially equal to the diameter of an inner hole, which is formed of the recesses 32 of the arm members 4 when the arm members are open. Furthermore, when the arm members 4 are in their closed positions in which the lock pin 13 is received in the recesses 32 as shown in FIG. 5, the distal ends of the arm members 4 contact each other. Accordingly, the diameter of a male screw formed of the male screw portions 8 of the arm members 4 becomes smaller than the inner diameter of the female screw portion 7a of the female port 7 of a fluid device.

When the lock pin 13 is inserted between the distal ends of the arm members 4, the outer peripheral surface of the lock pin 13 is engaged with the inner surfaces of front end portions of the arm members 4, thereby outwardly opening the arm members 4 and thus shifting them to their open positions in which they are parallel to each other. In FIG. 5, reference numbers 21, 22 denote Y-packings, however it can be contemplated to substitute O-rings for Y-packings, and reference numeral 23 denotes an O-ring. The other structure is similar to that of the first embodiment, and hence no description is given thereof.

The operation of connecting the pipe coupling constructed as above to the port of a fluid will now be described.

When the distal ends of the arm members 4 of the pipe coupling are inserted into the female screw port 7 of the fluid device, and the pushing knob 14 is pushed to thereby move the pipe coupling forward, the seal ring 10 of the seal holder 9 is pressed against the fluid device, and then is pushed back into the front cylinder 1 against the urging force of the spring 16, as is shown in FIG. 5. As a result, the projection 33a of the collar 33 is opposed to the escape recesses 40 formed in the outer peripheral surfaces of the arm members 4. When in this state, the pushing knob 14 provided at the rear end of the sliding rod 12 is further pushed, the front end 13a and inclined surface 13b of the lock pin 13 of the sliding rod 12 are substantially simultaneously brought into contact with both the arm members 4, whereby the arm members 4 assume their open state in which they are parallel to each other. At this time, the arm members 4 are guided while their rotation is limited by the cutout portions 31, and opened until the projection 33a of the collar 33 reaches the escape recesses 40. In this open position, the sliding rod 12 is inserted into the recesses 32 of the arm members 4, thereby inserting the lock pin 13 between the distal ends of the arm members 4 and engaging the male screw portions 8 of the arm members 4 with the female screw portion 7a of the female screw port 7 of the fluid device. This engaged state is maintained by dropping the ball 15 pressed to the axis O by the sleeve 19, onto the small-diameter portion 12b of the sliding rod 12 to thereby keep the sliding rod 12 in its pushed state.

As described above, also in this embodiment, the seal ring 10 is reliably pressed onto a portion of the fluid device around the port by the urging force of the spring 16, thereby executing reliable sealing. Further, in this embodiment, the seal holder 9 (the seal ring 10) can move forward or backward by the urging force of the spring 16 or against the urging force of the spring 16, until the screws 7a and 8 are engaged with each other. Where the seal ring 10 can be pushed into the front cylinder 1 against the urging force of the spring 16 at any time during connecting operation, (1) the seal ring 10 is prevented from deforming to the maximum extent, and an excessive stress does not occur in the seal ring 10, which means that the seal ring 10 can have a long life. Further, (2) even when in the open position of the arm members 4, the peaks of the thread of the male screw portions 8 are aligned with the peaks of the thread of the female portion 7a of the female port 7, which means that the screws are not engaged with each other, the pipe coupling can be easily moved forward and backward without applying excessive stress upon the seal ring. Accordingly, both the screws can be engaged with each other by forward or backward moving the arm members 4 by half of one peak. Moreover, the forward/backward movement of the seal holder 9 does not change the urging force of the spring 16, but the forward/backward movement of the sliding rod 12 does change the urging force of the spring 16. Therefore, even when correcting the engagement state of the screws, the seal ring 10 can execute reliable sealing.

Figure 7:
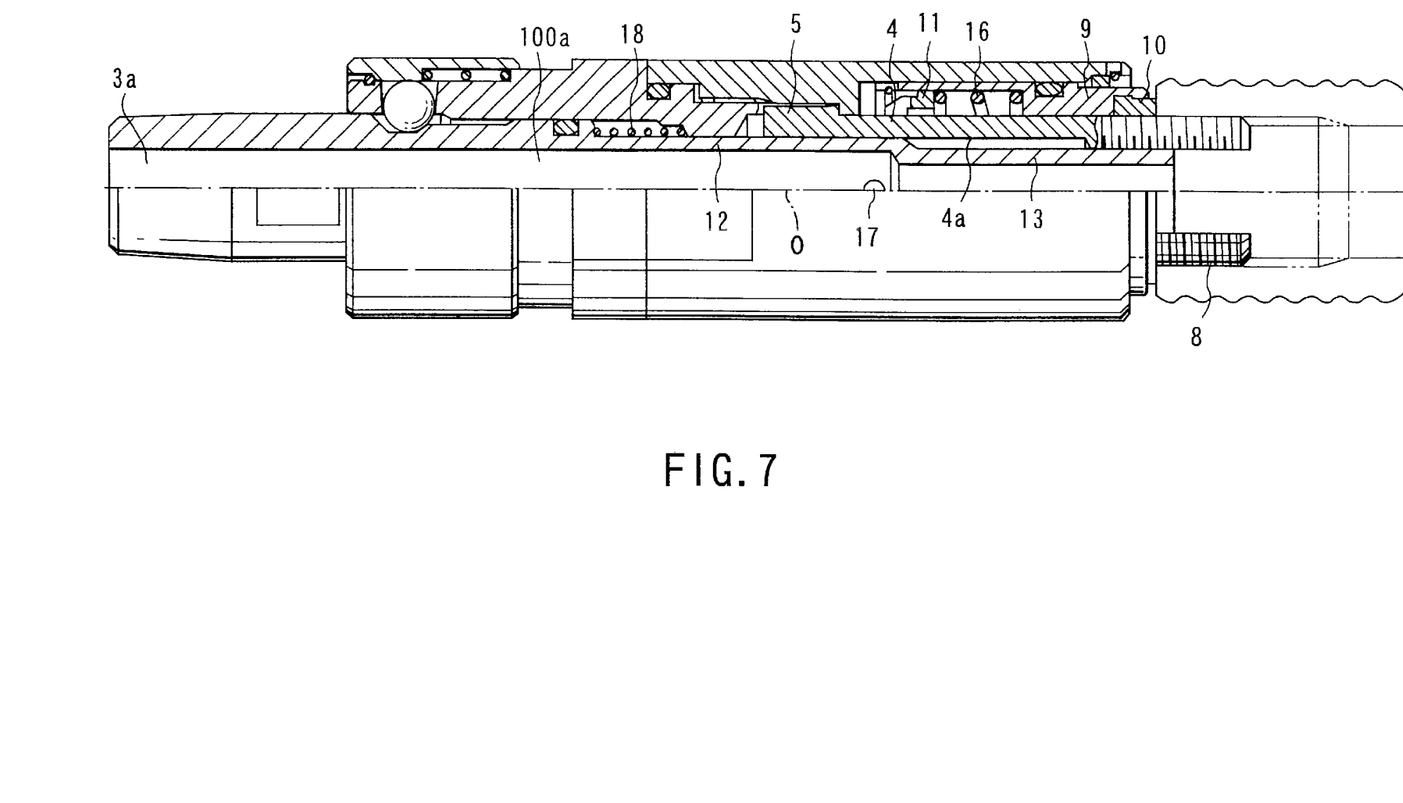
FIG. 7 is a partially sectional view of a pipe coupling for a female screw according to a fourth embodiment of the invention, showing its non-connected state.

FIG. 7 shows a fourth embodiment of the invention. In this section, the structure different from that of the first, second or third embodiment will be mainly described, and reference numerals corresponding to those used in the first, second or third embodiment denote similar structural elements.

In the first to third embodiments, the sliding rod 12 is just a hollow rod, whereas in the fourth embodiment, the sliding rod 12 is a tubular member having a fluid passage formed therein. A more detailed description will be given thereof.

As is shown in FIG. 7, a fluid passage 100a is formed through the sliding rod 12 along its axis. Further, a communication hole 3a is formed in a left end portion of the sliding rod 12, to which a hose, for example, is connected. The pushing operation of the sliding rod 12 may be executed by gripping, for example, the hose connected to the sliding rod 12 and moving it forward and/or backward, or may be executed by a pushing knob that is similar to that used in the first embodiment and is provided, when necessary, at an appropriate location at which it does not adversely affect the function of the pipe coupling.

Around the sliding rod 12, there are provided a front cylinder 1, a rear cylinder 2, arm members 4, recesses 4a, distal end male screw portions 8, a seal holder 9, a seal ring 10, a ring-shaped spring seat 11, pins 17, a spring 16, etc., which have the same functions as in the first embodiment.

As described above in detail, when, at the time of connecting the pipe coupling of the invention to the female screw port of a fluid device, the peaks of the thread of the female screw portion formed in the inner surface of the port of the fluid device are aligned with the peaks of the thread of the male screw portions of the arm members, and hence the male and female screws are not engaged with each other, even if the arm members 4 are shifted forward or backward by half of one peak, no gap will be created between the seal ring and a portion of the fluid device around the port since the seal holder is arranged to be able to move backward and forward through a sufficient distance. Also, at this time, no excessive force is applied to the seal ring, and hence reliable sealing can be executed. In addition, the arm members 4 can be kept closed while the pipe coupling is not operated, and therefore they can easily be inserted into the port of the fluid device when connecting the pipe coupling to the fluid device. The structure of the third embodiment, in which the arm members 4 are moved parallel to each other, has the advantages that the sliding rod requires a shorter stroke and the engagement of the screws can be executed more smoothly than in the structure in which the arm members 4 are arranged to swing.

The present invention is not limited to the above-described embodiments, but can be modified in various manners without departing from the gist. For example, the structure of the lock means of the sliding rod 12 or the connecting cylinder 3 can be modified freely. Further, the arm members 4 of the third embodiment can be changed to swing-type ones as in the first embodiment. Moreover, the pipe coupling of the invention can be used as a blank cap for the pressure test of a fluid device when a setscrew is screwed into the communication hole 3a. Also, in the first to third embodiments, the sliding rod can be formed of a tubular member as in the fourth embodiment.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A pipe coupling for a female screw to be connected to a female screw port formed in a fluid device, comprising:
   a cylindrical pipe coupling main body;
   a plurality of arm members contained in the pipe coupling main body and radially displaceable with respect to the pipe coupling main body, each of the arm members having a male screw portion provided on a distal end portion thereof and to be connected to the female screw port, the distal end portion projecting from an end of the pipe coupling main body to an outside thereof;
   a sliding member forward and backward slidably inserted in the pipe coupling main body, the sliding member shifting, by forward and backward movement thereof, the arm members between a closed position in which distal ends of the arm members contact each other, and an open position in which the distal ends of the arm members are separated from each other and the male screw portions of the distal end portions of the arm members can be engaged with the female screw port of the fluid device;
   a fluid passage formed in one of the sliding member and the pipe coupling main body and to be connected to a fluid passage formed in the fluid device when the male screw portions engage with the female screw port;
   a lock member provided in the pipe coupling main body for stopping movement of the sliding member such that the arm members are kept in the open position;
   a seal holder provided at an end of the pipe coupling main body and arranged to move forward and backward between an inner peripheral surface of the pipe coupling main body and outer peripheral surfaces of the arm members;
   a spring seat fitted on outer peripheral surface of the arm members such that it can move forward and backward;
   a spring interposed between the spring seat and the seal holder and urging the spring seat and the seal holder away from each other;
   a seal member provided on the seal holder and to be pressed against around the female screw port of the fluid device by an urging force of the spring to seal the female screw port; and
   a pressing member provided on the sliding member and to be brought into contact with the spring seat when the sliding member is moved in a direction in which the arm members are opened, thereby moving the spring seat so as to increase the urging force of the spring.

2. The pipe coupling according to claim 1, wherein the arm members are kept in the closed position when they contact the pressing member provided on the sliding member.

3. A pipe coupling for a female screw to be connected to a female screw port formed in a fluid device, comprising:
   a cylindrical pipe coupling main body;
   a plurality of arm members contained in the pipe coupling main body and radially displaceable with respect to the pipe coupling main body, each of the arm members having a male screw portion provided on a distal end portion thereof and to be connected to the female screw port, each of the arm members having an escape recess formed in the outer peripheral surface thereof, the distal end portion projecting from an end of the pipe coupling main body to an outside thereof;
   a sliding member forward and backward slidably inserted in the pipe coupling main body, the sliding member shifting, by forward and backward movement thereof, the arm members between a closed position in which distal ends of the arm members contact each other, and an open position in which the distal ends of the arm members are separated from each other and the male screw portions of the distal end portions of the arm members can be engaged with the female screw port of the fluid device;
   a fluid passage formed in one of the sliding member and the pipe coupling main body and to be connected to a fluid passage formed in the fluid device when the male screw portions engage with the female screw port;
   a lock member provided in the pipe coupling main body for stopping movement of the sliding member such that the arm members are kept in the open position;
   a seal holder provided at an end of the pipe coupling main body and arranged to move forward and backward between an inner peripheral surface of the pipe coupling main body and outer peripheral surfaces of the arm members;

a spring interposed between the pipe coupling main body and the seal holder and urging the seal holder toward one end of the pipe coupling main body;

a seal member provided on the seal holder and to be pressed against around the female screw port of the fluid device by an urging force of the spring to seal the female screw port; and a collar slidably provided in the seal holder, the collar being moved into the pipe coupling main body together with the seal holder against the urging force of the spring from a first position in which the collar is in contact with the arm members such that the arm members are kept in the closed position, to a second position in which a clearance for permitting the arm members to move to the open position is formed between the collar and the escape recess formed in each arm member.

4. The pipe coupling according to claim 3, wherein the arm members move in a direction perpendicular to a direction in which the sliding member moves forward and backward, while they are kept parallel to each other, thereby assuming the open position.

5. The pipe coupling according to claim 1, wherein a groove to be engaged with the lock member is formed in an outer peripheral surface of the sliding member, movement of the sliding member being stopped when the lock member is engaged with the groove, thereby the arm members are kept in the open position and further comprising a sleeve slidably provided on the pipe coupling main body for keeping the lock member engaged with the groove.

6. A pipe coupling according to claim 3, wherein a groove to be engaged with the lock member is formed in an outer peripheral surface of the sliding member, movement of the sliding member being stopped when the lock member is engaged with the groove, thereby the arm members are kept in the open position and further comprising a sleeve slidably provided on the pipe coupling main body for keeping the lock member engaged with the groove.

* * * * *